US 12,428,175 B2

(12) United States Patent
Uchibori et al.

(10) Patent No.: US 12,428,175 B2
(45) Date of Patent: Sep. 30, 2025

(54) STORAGE DEVICE, UNMANNED AERIAL VEHICLE, AND SYSTEM

(71) Applicant: NIPPON TELEGRAPH AND TELEPHONE CORPORATION, Tokyo (JP)

(72) Inventors: Daisuke Uchibori, Tokyo (JP); Atsushi Aratake, Tokyo (JP); Yosuke Sakurada, Tokyo (JP); Yujin Hamano, Tokyo (JP); Kazuaki Watanabe, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 30 days.

(21) Appl. No.: 18/269,246

(22) PCT Filed: Dec. 24, 2020

(86) PCT No.: PCT/JP2020/048565
§ 371 (c)(1),
(2) Date: Jun. 22, 2023

(87) PCT Pub. No.: WO2022/137462
PCT Pub. Date: Jun. 30, 2022

(65) Prior Publication Data
US 2024/0051690 A1 Feb. 15, 2024

(51) Int. Cl.
*B64U 10/13* (2023.01)
*B64C 25/34* (2006.01)
(Continued)

(52) U.S. Cl.
CPC .............. *B64U 80/25* (2023.01); *B64C 25/34* (2013.01); *B64F 1/12* (2013.01); *E02D 29/14* (2013.01);
(Continued)

(58) Field of Classification Search
CPC ........ B64U 70/50; B64U 70/70; B64U 70/90; B64U 70/99; B64U 80/70; B64U 60/00; B64U 60/20; B64U 10/13
See application file for complete search history.

(56) References Cited

U.S. PATENT DOCUMENTS

| 2016/0144982 A1* | 5/2016 | Sugumaran | B64F 1/005 |
| | | | 244/108 |
| 2021/0229807 A1* | 7/2021 | Ballerini | B64F 1/02 |

FOREIGN PATENT DOCUMENTS

| JP | 2015223995 A | * | 12/2015 |
| JP | 2018199403 A | * | 12/2018 |

OTHER PUBLICATIONS

Unknown Author (2018) "[Drone technique] Drone hand catch method and necessity [Notes]" Skyfish's Drone Blog, Apr. 8, 2018 [online] website: https://www.droneskyfish.com/entry/hand-catch-drone.

(Continued)

*Primary Examiner* — Nicholas McFall
*Assistant Examiner* — Justin Michael Heston

(57) ABSTRACT

A storage device (20) according to the present disclosure is a storage device that stores an unmanned aerial vehicle (30), and includes a main body portion (21) having a curved surface on which the unmanned aerial vehicle (30) is movable by bringing its wheels (302) into contact therewith, and a gripping portion (23) for gripping the unmanned aerial vehicle (30).

12 Claims, 22 Drawing Sheets

(51) Int. Cl.
  *B64F 1/12*   (2006.01)
  *B64U 80/25*  (2023.01)
  *E02D 29/14*  (2006.01)
  *B64U 101/26* (2023.01)
  *B64U 101/30* (2023.01)
  *B64U 101/70* (2023.01)

(52) U.S. Cl.
  CPC .......... *B64U 10/13* (2023.01); *B64U 2101/26* (2023.01); *B64U 2101/30* (2023.01); *B64U 2101/70* (2023.01); *B64U 2201/10* (2023.01); *E02D 2600/00* (2013.01)

(56) References Cited

OTHER PUBLICATIONS

Kenta Tsuchiya (2017) "AIRMADA's Fully Autonomous Drone Station" literature, Jan. 18, 2017 [online] website: https://www.borg.media/airmada-2017-01-18/.

\* cited by examiner

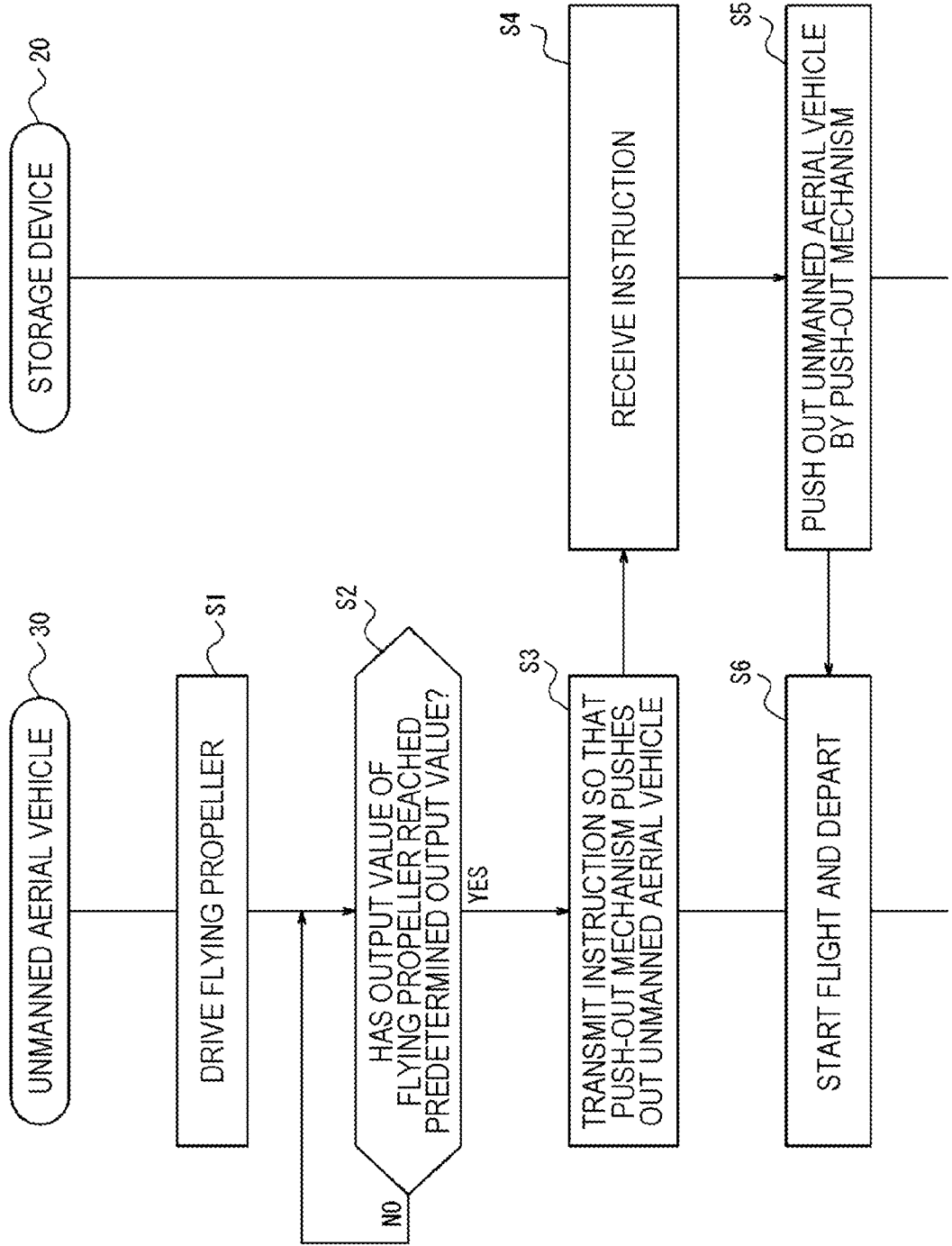

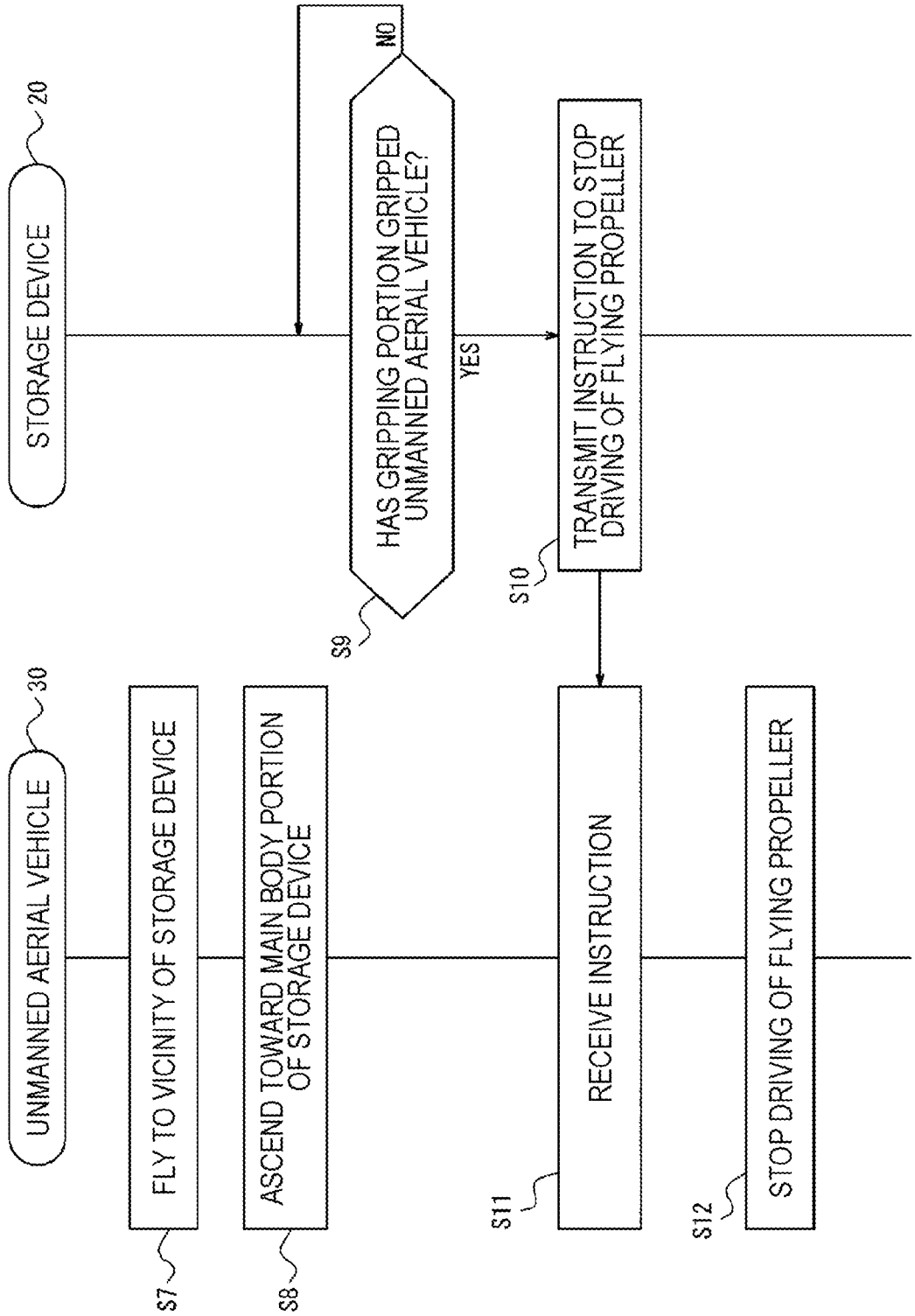

STORAGE DEVICE, UNMANNED AERIAL VEHICLE, AND SYSTEM

CROSS-REFERENCE TO RELATED APPLICATIONS

This application is a U.S. National Stage Application filed under 35 U.S.C. § 371 claiming priority to International Patent Application No. PCT/JP2020/048565, filed on 24 Dec. 2020, the disclosure of which is hereby incorporated herein by reference in its entirety.

TECHNICAL FIELD

The present disclosure relates to a storage device, an unmanned aerial vehicle, and a system.

BACKGROUND ART

In recent years, unmanned aerial vehicles (for example, drones, multicopters, or the like) that fly by rotation of a plurality of propellers have been able to be used for inspection of infrastructure structures.

As a method for bringing such an unmanned aerial vehicle into and out of storage, using manual hand release and catching is known (Non Patent Literature 1). As another method, it is known to use a ground station that is installed on the ground and autonomously stores an unmanned aerial vehicle (Non Patent Literature 2).

CITATION LIST

Non Patent Literature

Non Patent Literature 1: "[Drone Techniques] Method and Necessity of Hand Catching of Drones [Notes]," [online], Apr. 8, 2018, [Retrieved on Dec. 15, 2020], Internet <URL:https://www.droneskyfish.com/entry/hand-catch-drone>

Non Patent Literature 2: Kenta Tsuchiya, "AIRMADA's Fully Autonomous Drone Station," [online], Jan. 18, 2017, [Retrieved on Dec. 15, 2020], Internet <URL: https://www.borg.media/airmada-2017-01-18/>

SUMMARY OF INVENTION

Technical Problem

However, the method of using the hand release and catching requires human hands skilled in bringing unmanned aerial vehicles into and out of storage. Since it is assumed that a ground station is installed on the ground, when a ground station used is in an underground infrastructure facility, accumulated water due to water leakage or the like is generated, and an unmanned aerial vehicle may be damaged.

An object of the present disclosure made in view of such circumstances is to provide a storage device, an unmanned aerial vehicle, and a system capable of safely performing departure and return operations of the unmanned aerial vehicle without human intervention regardless of whether the unmanned aerial vehicle is under the ground or on the ground, or indoors or outdoors.

Solution to Problem

In order to achieve the above-described object, according to the present disclosure, there is provided a storage device that stores an unmanned aerial vehicle, the storage device including a main body portion having a curved surface on which the unmanned aerial vehicle is movable by bringing its wheels into contact therewith, and a gripping portion for gripping the unmanned aerial vehicle.

In addition, according to the present disclosure, there is provided an unmanned aerial vehicle including a main body portion, a flying propeller, a support portion extending upward from the main body portion, and a wheel provided at an end portion of the support portion and at least partially protruding upward from an upper surface of the flying propeller.

In addition, according to the present disclosure, there is provided a system including the storage device according to the present disclosure and the unmanned aerial vehicle according to the present disclosure.

Advantageous Effects of Invention

According to the present disclosure, it is possible to provide a storage device, an unmanned aerial vehicle, and a system capable of safely performing departure and return operations of the unmanned aerial vehicle without human intervention regardless of whether the unmanned aerial vehicle is under the ground or on the ground, or indoors or outdoors.

BRIEF DESCRIPTION OF DRAWINGS

FIG. 11A is a diagram illustrating an operation of the system according to Modification 4.

FIG. 11B is a diagram illustrating an operation of the system according to Modification 4.

DESCRIPTION OF EMBODIMENTS

Figure 1:
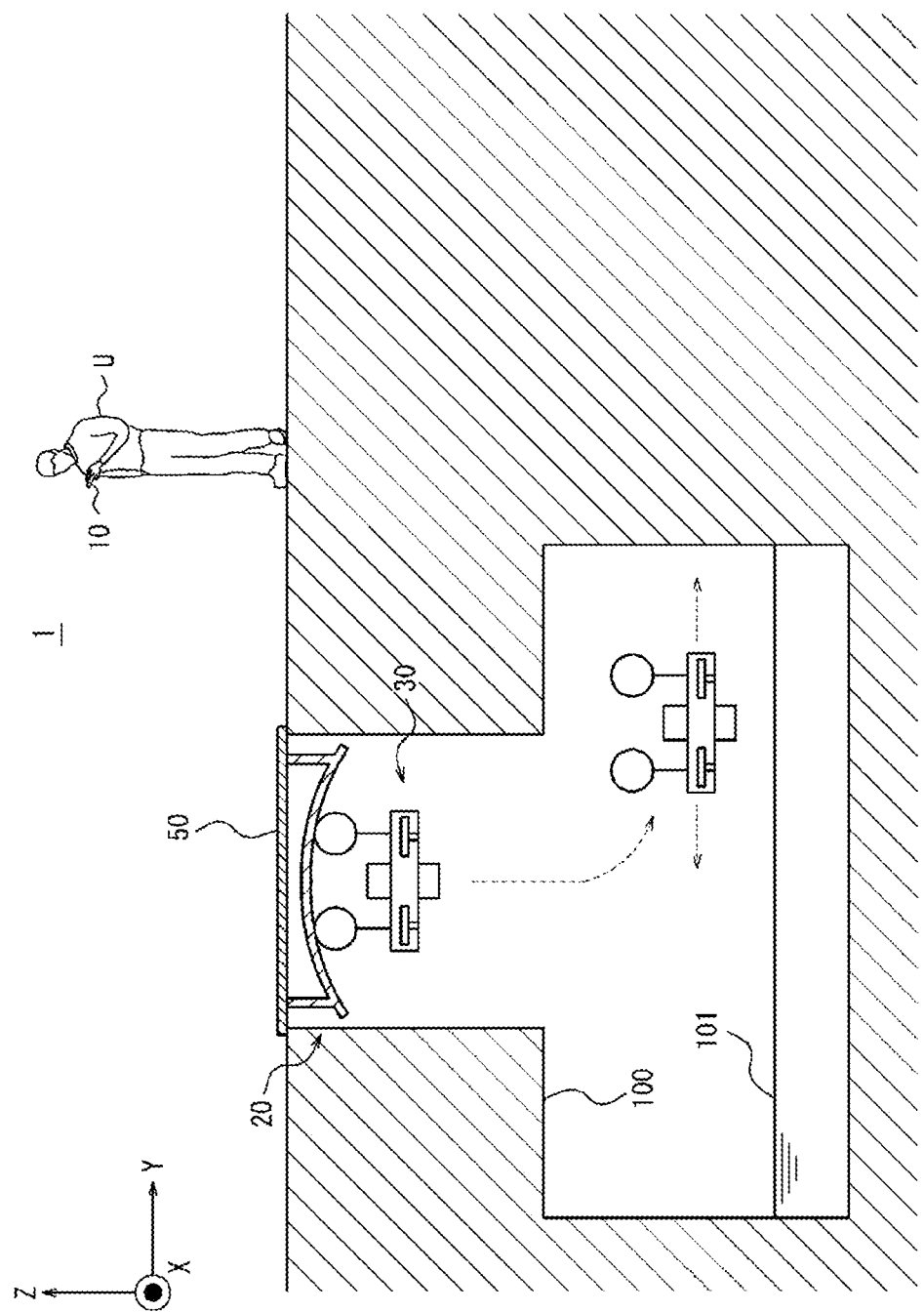
FIG. 1 is a view for describing a system according to an embodiment of the present disclosure.

Hereinafter, embodiments of the present disclosure will be described with reference to the drawings as appropriate. The embodiments described below are examples of a configuration of the present disclosure, and the present disclosure is not limited to the following embodiments.

Note that "upward" and "downward" in the following description mean directions parallel to a Z axis of the coordinate axis display drawn in the drawings, and "horizontal" means directions parallel to an XY plane of the coordinate axis display drawn in the drawings.

<Schematic Configuration of System 1>

First, a system 1 according to the present disclosure will be described. FIG. 1 is a diagram illustrating an outline of a system 1. The system 1 illustrated in FIG. 1 includes a storage device 20 and an unmanned aerial vehicle 30. The system 1 may further include a terminal device 10. Note that FIG. 1 illustrates a case where the number of unmanned aerial vehicles 30 is one, but the number of unmanned aerial vehicles 30 may be plural.

A removable lid 50 is placed on an opening of a manhole 100 so as to close an entrance of the manhole 100. The storage device 20 is attached to the lower surface of the lid 50 of the manhole 100. The storage device 20 may be installable in place of the lid 50. FIG. 1 illustrates a state in which the storage device 20 is attached to the lower surface of the lid 50 of the manhole 100, that is, a state in which the storage device is installed above the upper hole of the manhole 100.

The manhole 100 is, for example, a communication manhole. The manhole may be referred to as a maintenance hole. In the infrastructure facility in the manhole 100, accumulated water 101 due to water leakage or the like may be generated. In the present embodiment, the system 1 is applied to the manhole 100, but is not limited thereto, and may be applied to various storage tanks such as a silo. The system 1 may be applied in any space where the unmanned aerial vehicle 30 can fly, and may be applied to an indoor or outdoor facility under the ground or on the ground.

The terminal device 10 is carried and operated by an operator (for example, an inspector) U of the unmanned aerial vehicle 30. Wireless communication is performed between the terminal device 10 and the unmanned aerial vehicle 30. The operator U operates the terminal device 10 to control the operation of the unmanned aerial vehicle 30. The unmanned aerial vehicle 30 can fly even without an instruction related to flight control from the terminal device 10.

In the system 1, the unmanned aerial vehicle 30 captures an image of the inside of the manhole 100 (in other words, an aerial image) while autonomously controlling the flight or controlling the flight according to the operation of the terminal device 10 by the operator U. The unmanned aerial vehicle 30 may transmit the captured image data to the terminal device 10. The operator U inspects the inside of the manhole 100 by checking the image data captured by the unmanned aerial vehicle 30. Note that items to be inspected by the operator U are, for example, the presence or absence of abnormality of the inner wall (that is, the wall surface) of the manhole 100, the state of groundwater stored in the underground passage leading to the manhole 100, the state of an object (structures, devices, or the like) installed in the manhole 100, and the like.

<Configuration of Unmanned Aerial Vehicle 30>

Figure 2:
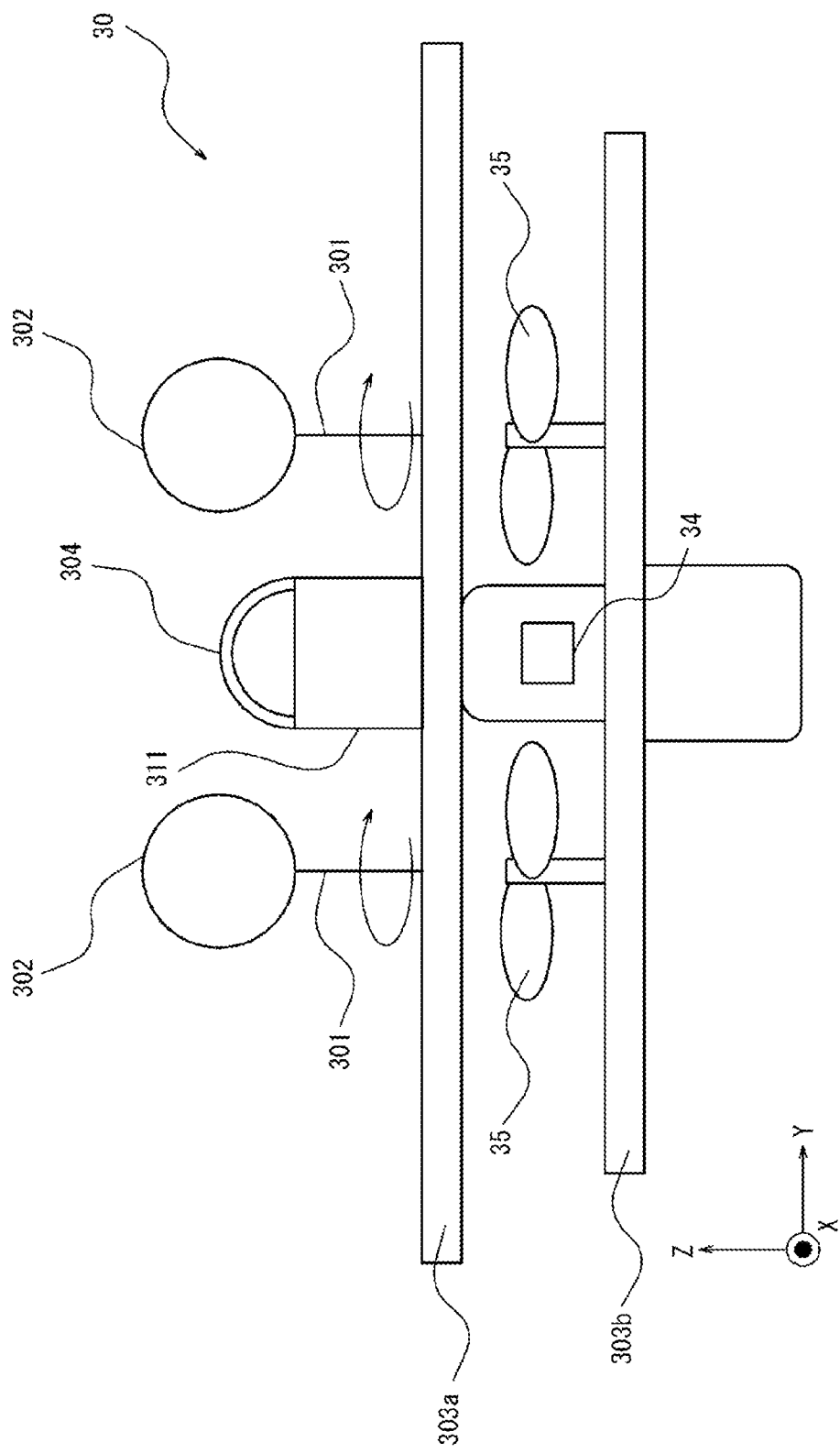
FIG. 2 is a view illustrating an example of an unmanned aerial vehicle according to the embodiment of the present disclosure.

FIG. 2 is a front view illustrating an appearance example of the unmanned aerial vehicle 30. As illustrated in FIG. 2, the unmanned aerial vehicle 30 includes a control box 311 incorporating a control board, at least one flying propeller 35, a main body portion 303a and a main body portion 303b, support portions 301 extending upward from the main body portion 303a, wheels 302 provided at end portions of the support portions 301, a gripped portion 304 provided on an upper surface of the control box 311, and a camera 34. The main body portion 303a is a buffering bumper that absorbs vibration and impact. The main body portion 303b is an arm that supports the flying propeller 35. The main body portion 303a and the main body portion 303b may be integrally configured. The unmanned aerial vehicle 30 may include a plurality of cameras 34. The gripped portion 304 has a semi-annular shape, and is hooked and gripped by an end portion of a gripping portion 23 of the storage device 20, as will be described later. The unmanned aerial vehicle 30 can be stored in the storage device 20 in a state of being suspended from the storage device 20 via the gripped portion 304 and the gripping portion 23.

As illustrated in FIG. 2, the highest surface of the wheel 302 in the upward direction is located above the upper surface of the flying propeller 35. In the example illustrated in FIG. 2, the support portion 301 is provided on the main body portion 303a, but may be provided on the main body portion 303b. Even when provided on the main body portion 303b, the highest surface of the wheel 302 in the upward direction is located above the upper surface of the flying propeller 35. In this way, the wheel 302 at least partially protrudes upward from the upper surface of the flying propeller 35.

As will be described later, when the unmanned aerial vehicle 30 comes into contact with the storage device 20, the wheels 302 are pressed against the storage device 20 and freely rotate. The free rotation of the wheels 302 enables the unmanned aerial vehicle 30 to move while contacting the storage device 20. The wheels 302 may be driven by a motor (not illustrated). As indicated by arrows in FIG. 2, the support portion 301 is rotatable in the horizontal direction. The direction of rotation is not particularly limited, and rotation may be possible in either a clockwise direction or a counterclockwise direction. When the support portion 301 rotates, the wheel 302 connected to the support portion 301 can also rotate in the horizontal direction.

The number of wheels 302 and the number of support portions 301 may be freely set, but as will be described later, the number is desirably such that the unmanned aerial vehicle 30 can be kept horizontal when the wheels 302 come into contact with the storage device 20. Therefore, for example, it is desirable that the number of each of support portions 301 and wheels 302 be three or more. In the present embodiment, the material of the wheel 302 is rubber, but is not limited thereto, and the member may be a spherical member of, for example, plastic or resin. The wheel 302 may be a ball caster made of resin.

Figure 3:
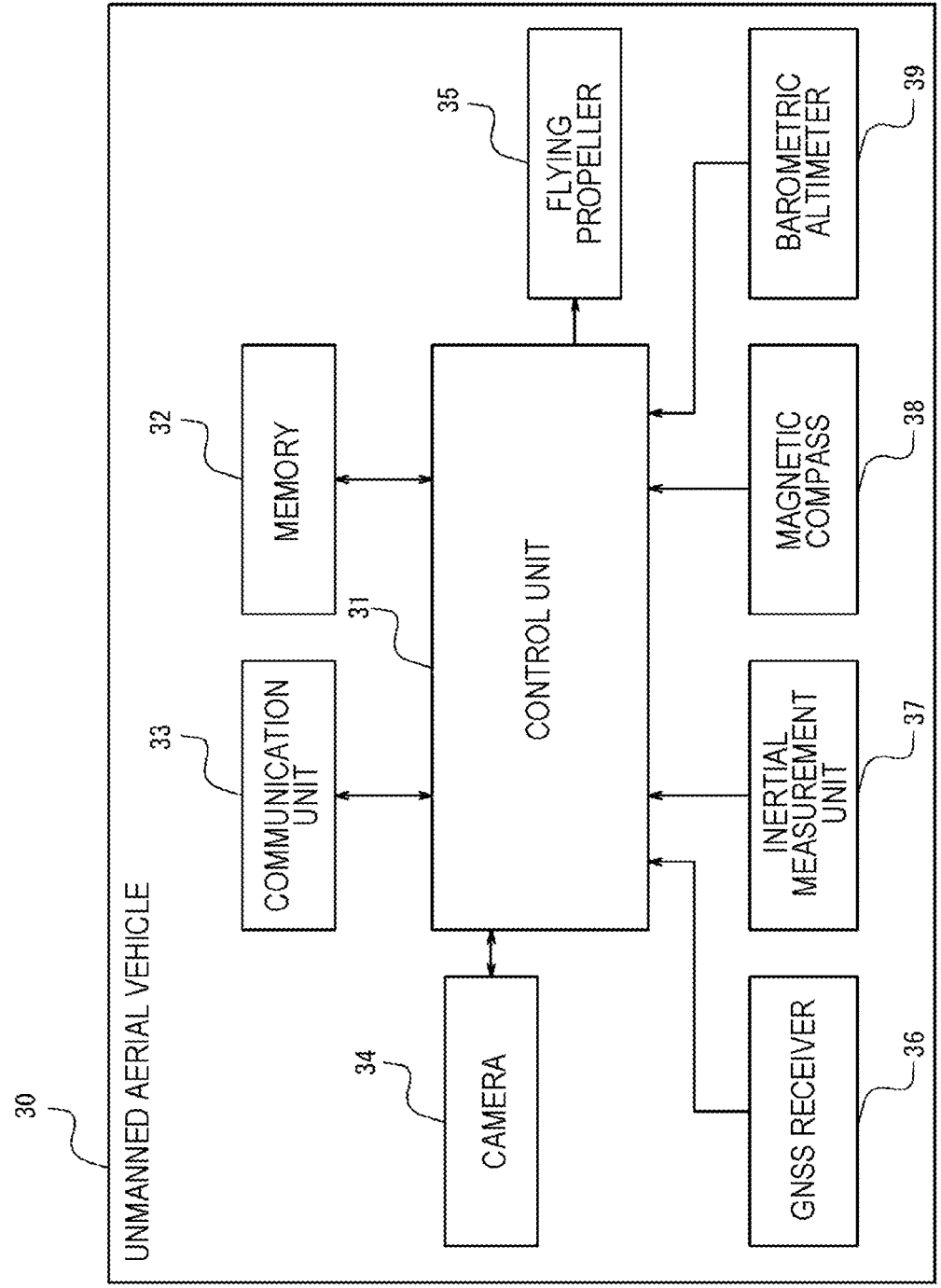
FIG. 3 is a block diagram illustrating a configuration of the unmanned aerial vehicle according to the embodiment of the present disclosure.

FIG. 3 is a block diagram illustrating an internal configuration example of the unmanned aerial vehicle 30. The unmanned aerial vehicle 30 includes a control unit 31, a memory 32, a communication unit 33, a camera 34, flying propellers 35, a GNSS receiver 36, an inertial measurement unit (IMU) 37, a magnetic compass 38, and a barometric altimeter 39.

The communication unit 33 performs wireless communication with the terminal device 10. Examples of the wireless communication method include a wireless LAN such as Wi-Fi (registered trademark) or specified low power radio communication. The communication unit 33 may also be able to communicate with the storage device 20.

The camera 34 captures an image of the surroundings of the unmanned aerial vehicle 30 and generates data of the captured image. The image data of the camera 34 is stored in the memory 32.

The flying propeller 35 rotates by driving of a motor (not illustrated) to generate lift. In the present embodiment, the number of each of the flying propellers 35 and the motors is four, but the present disclosure is not limited thereto, and may be freely set.

The GNSS receiver 36 receives a plurality of signals indicating times transmitted from GNSS satellites which are a plurality of navigation satellites and positions (for example, coordinates) of the GNSS satellites. The GNSS receiver 36 calculates the position (that is, the position of the unmanned aerial vehicle 30) of the GNSS receiver 36 on the basis of the plurality of received signals. The GNSS receiver 36 outputs the position information of the unmanned aerial vehicle 30 to the control unit 31.

The inertial measurement unit 37 detects the attitude of the unmanned aerial vehicle 30 and outputs a detection result to the control unit 31. The inertial measurement unit 37 detects, as the attitude of the unmanned aerial vehicle 30, accelerations in three axial directions of forward and rearward, left and right, and up and down of the unmanned aerial vehicle 30, and angular velocities in three axial directions of a pitch axis, a roll axis, and a yaw axis. The inertial measurement unit 37 can measure whether the unmanned aerial vehicle 30 maintains a horizontal attitude.

The magnetic compass 38 detects a direction of the heading of the unmanned aerial vehicle 30, and outputs a detection result to the control unit 31. The barometric altimeter 39 detects an altitude at which the unmanned aerial vehicle 30 is flying, and outputs a detection result to the control unit 31.

The memory 32 stores computer programs and the like necessary for the control unit 31 to control the camera 34, the flying propeller 35, the GNSS receiver 36, the inertial measurement unit 37, the magnetic compass 38, and the barometric altimeter 39. The memory 32 may be a computer-readable recording medium. The memory 32 may be provided inside the unmanned aerial vehicle 30 or may be provided detachably from the unmanned aerial vehicle 30.

In the present embodiment, the control unit 31 is a processor such as a central processing unit (CPU), a micro processing unit (MPU), a graphics processing unit (GPU), a digital signal processor (DSP), or a system on a chip (SoC), and may be configured by a plurality of processors of the same or different types. The control unit 31 may be configured by dedicated hardware such as an application specific integrated circuit (ASIC), a field-programmable gate array (FPGA), or the like.

The control unit 31 performs signal processing for integrally controlling the operation of each unit of the unmanned aerial vehicle 30, data input/output processing with other units, and data calculation processing. The control unit 31 controls autonomous flight of the unmanned aerial vehicle 30 according to a computer program stored in the memory 32. When autonomously flying, the control unit 31 refers to data such as a flight path and a flight time stored in the memory 32. Note that the control unit 31 may control the flight of the unmanned aerial vehicle 30 in accordance with a command received from the terminal device 10 via the communication unit 33.

The control unit 31 acquires and analyzes image data captured by the camera 34 to specify the environment around the unmanned aerial vehicle 30. The control unit 31 controls the flight to avoid an obstacle, for example, on the basis of the environment around the unmanned aerial vehicle 30. The control unit 31 controls the flying propeller 35 to control the flight of the unmanned aerial vehicle 30. In the flight control, the position including the latitude, longitude, and altitude of the unmanned aerial vehicle 30 is changed.

<Configuration of Storage Device 20>

Figure 4A:
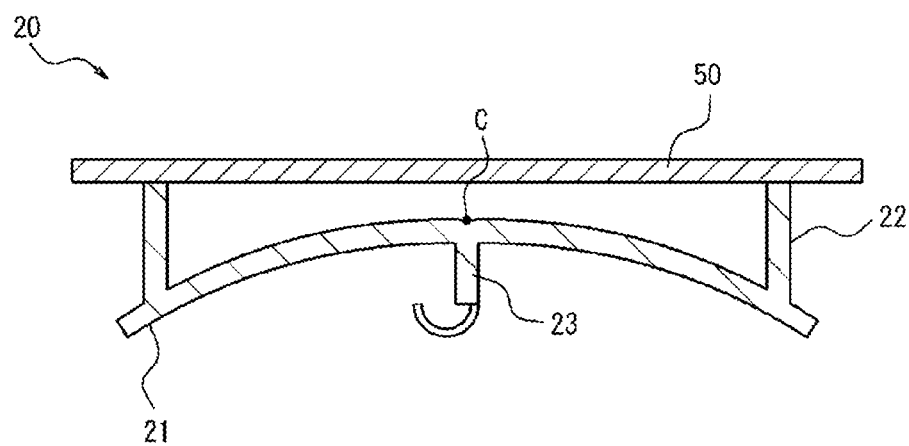
FIG. 4A is a cross-sectional view of a storage device for describing a storage device according to the embodiment of the present disclosure.
Figure 4B:
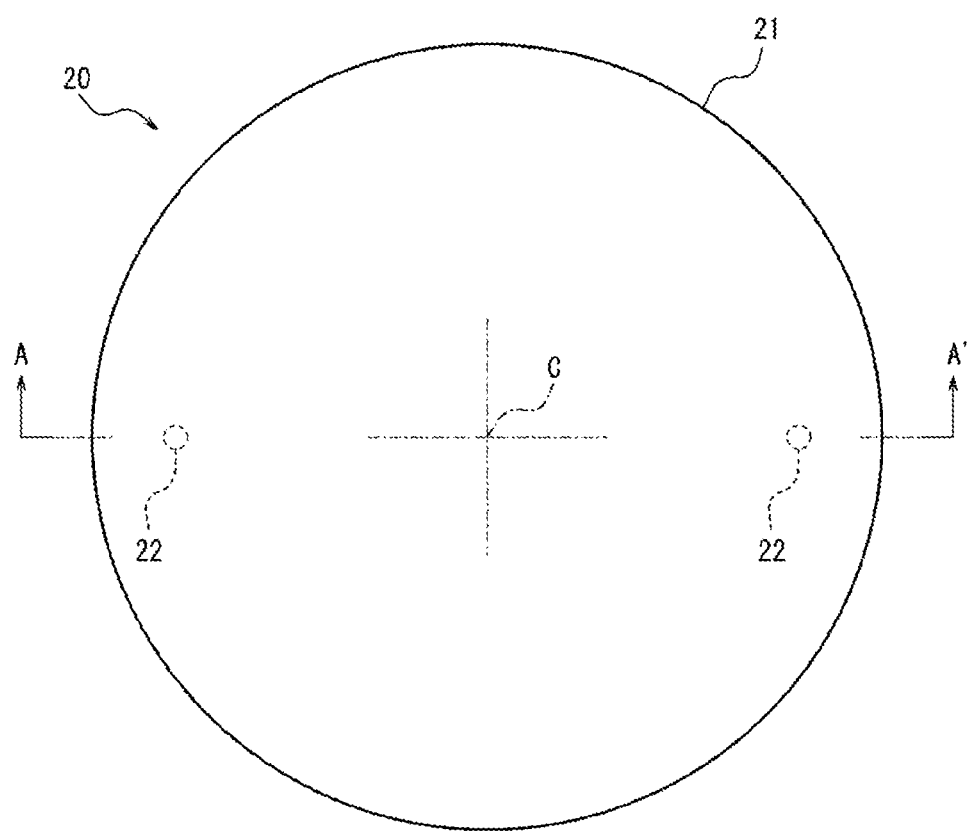
FIG. 4B is a plan view of the storage device according to the embodiment of the present disclosure.

FIGS. 4A and 4B are views schematically illustrating an appearance example of the storage device 20. FIG. 4B is a plan view of the storage device 20 in a state of being attached to the lid 50 of the manhole 100. FIG. 4A is a cross-sectional view taken along line A-A' of the storage device 20 of FIG. 4B. As illustrated in FIG. 4A, the storage device 20 includes a main body portion 21 having a curved surface, a support portion 22 that connects the main body portion 21 and the lid 50 of the manhole 100, and a gripping portion 23. The main body portion 21 and the support portion 22 may be integrated. The support portion 22 is attached to the back surface of the lid 50 with a screw or the like. The support portion 22 may be detachably attached, which facilitates attachment of the storage device 20 to the existing lid 50.

As illustrated in FIG. 4B, the main body portion 21 is formed of a plate-like body having a circular shape as a whole. As illustrated in FIG. 4A, the main body portion 21 of the present embodiment includes a curved surface in which a center point indicated by a symbol C protrudes most upward and is curved downward toward a peripheral edge portion. Due to the curved surface, the storage device 20 has an umbrella-shaped or dome-shaped shape with a downward opening. More specifically, a curvature k increases toward the outer periphery of the circle of the main body portion 21. That is, $k(x)$ is a curvature at a position of a radius x of the circle of the main body portion 21, and when $x1<x2$, it can be said that $k(x1)<k(x2)$. With this structure, in the vicinity of the center point of the main body portion 21, the unmanned aerial vehicle 30 can maintain a horizontal attitude with the wheels 302 in contact.

The shape of the main body portion 21 is not limited thereto, and may be a shape of a part of a quadratic curved surface such as a spherical surface, a spheroidal surface, a paraboloid of revolution, or a hyperboloid. The main body portion 21 may have the shape of a cone. Further, the main body portion 21 may have a polygonal pyramid shape such as a triangular pyramid or a quadrangular pyramid having a flat surface instead of a curved surface. Although the main body portion 21 may be formed of any member, it is desirable that the unmanned aerial vehicle 30 have a resistance to damage even if the unmanned aerial vehicle collides with a force. The main body portion 21 may be made of, for example, a resin such as polyethylene terephthalate or polycarbonate.

The gripping portion 23 is provided in the vicinity of the center point of the storage device 20. The gripping portion 23 has a hook shape, and can grip the unmanned aerial vehicle 30 by being caught by the gripped portion 304 of the unmanned aerial vehicle 30. The gripping portion 23 has strength sufficient to grip the unmanned aerial vehicle 30 in a suspended state even when the unmanned aerial vehicle 30 completely stops the operation of the flying propeller 35.

The gripping portion 23 is not limited to the hook shape, and any shape capable of gripping the unmanned aerial vehicle 30 may be employed. For example, the gripping portion 23 may be an adhesive body. In this case, the gripped portion 304 of the unmanned aerial vehicle 30 also includes an adhesive body, and the unmanned aerial vehicle 30 is gripped by the storage device 20 when both the adhesive bodies come into contact with each other. Alternatively, the gripping portion 23 may have a male screw structure. In this case, the gripped portion 304 of the unmanned aerial vehicle 30 has a female screw structure, and the unmanned aerial vehicle 30 is gripped by the storage device 20 by fitting both screws. The gripping portion 23 may have a female screw structure, and the gripped portion 304 may have a male screw structure.

<Operation of System 1>

Figure 5A:
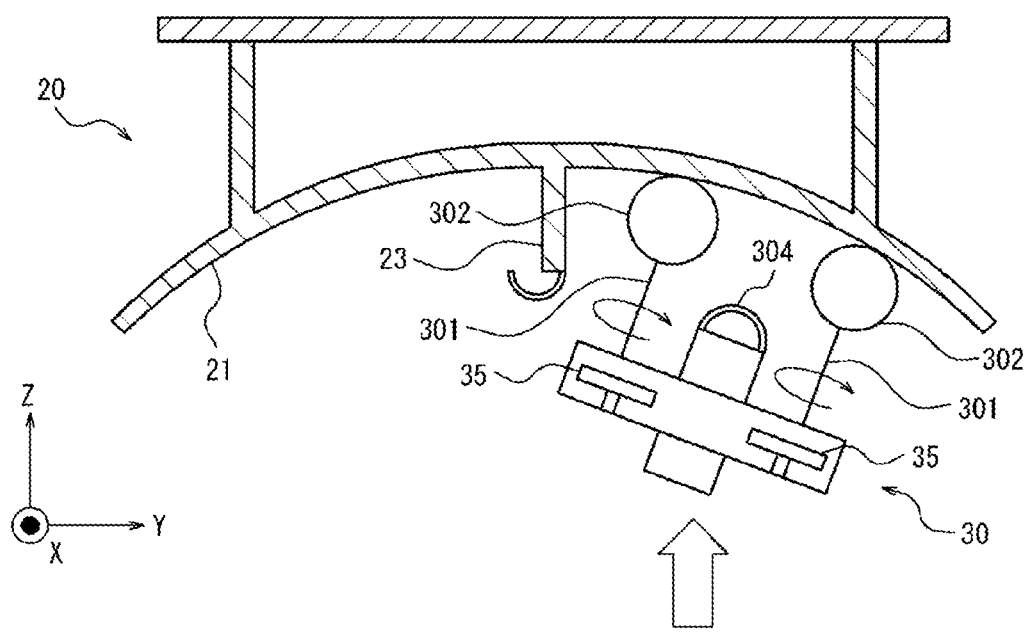
FIG. 5A is a view for describing a system according to the embodiment of the present disclosure.
Figure 5B:
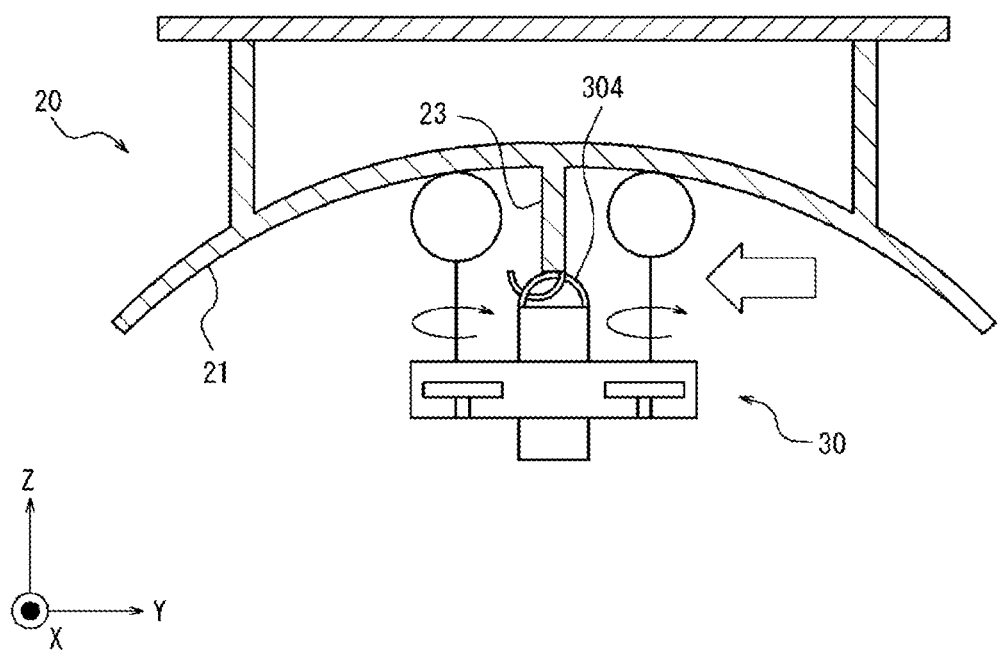
FIG. 5B is a view for describing the system according to the embodiment of the present disclosure.
Figure 5C:
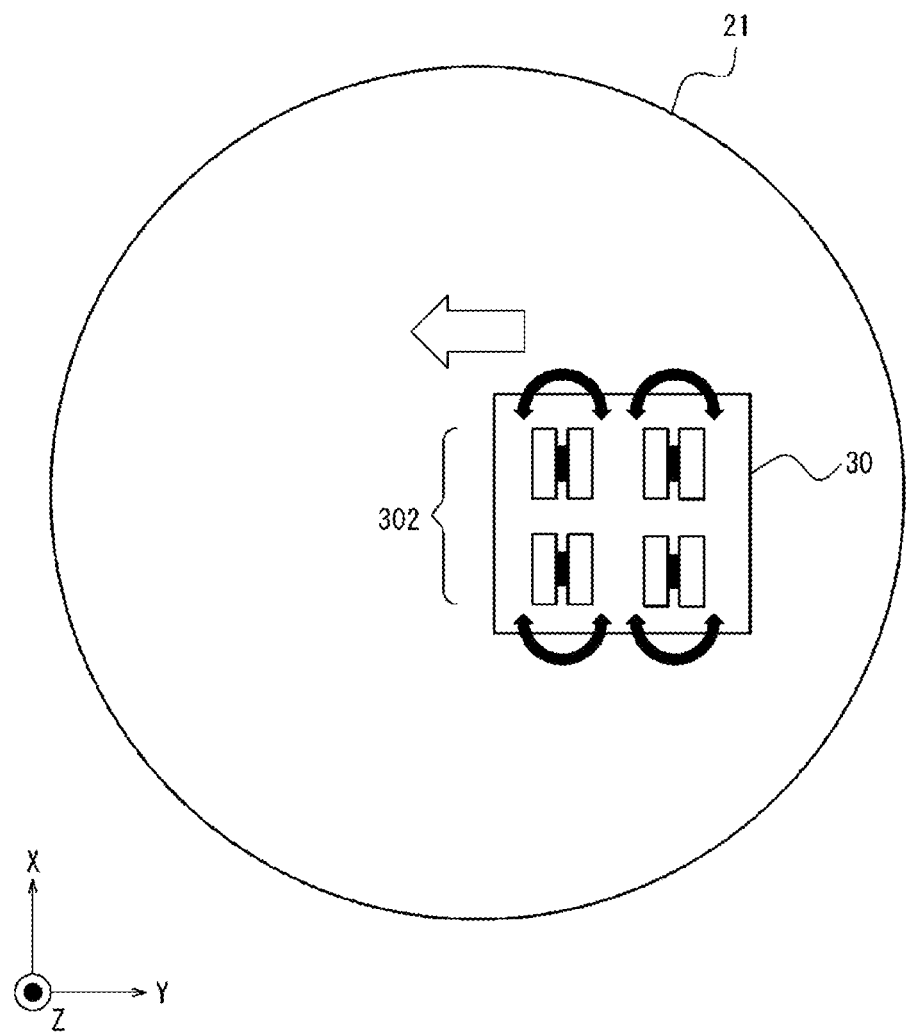
FIG. 5C is a view for describing the system according to the embodiment of the present disclosure.

Next, the operation of the system 1 will be described with reference to FIGS. 5A, 5B, and 5C. FIGS. 5A to 5C illustrate a state in which the unmanned aerial vehicle 30 is stored in the storage device 20. White arrows in FIGS. 5A to 5C indicate a moving direction of the unmanned aerial vehicle 30. FIGS. 5A and 5B are views of a state in which the unmanned aerial vehicle 30 is stored in the storage device 20 as viewed from the side. FIG. 5C is a view of the unmanned aerial vehicle 30 seen from above through the storage device 20. The unmanned aerial vehicle 30 completes the inspection in the manhole 100 automatically or by the operation of a user U, flies to the vicinity of the storage device 20, and returns.

As illustrated in FIG. 5A, the unmanned aerial vehicle 30 ascends due to the lift of the flying propeller 35. The unmanned aerial vehicle 30 comes into contact with an arbitrary appropriate position of the main body portion 21 of the storage device 20 via the wheels 302. Even after the wheels 302 start to come into contact with the main body portion 21, the unmanned aerial vehicle 30 continues to ascend, so that the wheels 302 are pressed upward. At this time, the support portion 301 rotates freely, and thus the wheels 302 can also rotate and roll on the curved surface of the main body portion 21. As the unmanned aerial vehicle 30 continues to ascend, the wheels 302 roll toward the vicinity of the center point protruding to the uppermost side of the curved surface of the main body portion 21. As indicated by black arrows in FIG. 5C, each of the wheels 302 is freely rotatable. Accordingly, the wheels 302 can quickly move on the curved surface.

As illustrated in FIG. 5B, the wheels 302 rotate, and the unmanned aerial vehicle 30 moves to the vicinity of the center point of the storage device 20 while being in contact with the storage device 20. Then, the control unit 31 of the unmanned aerial vehicle 30 detects that the unmanned aerial vehicle 30 is aligned with the storage device 20. The aligned state refers to a state in which the unmanned aerial vehicle 30 is stored in the storage device 20 and is at a position or at an angle at which the operation of the flying propeller 35 can be stopped until the next flight. Any method may be employed for the detection of the alignment, but for example, when the inertial measurement unit 37 of the unmanned aerial vehicle 30 detects that the unmanned aerial vehicle 30 takes a horizontal attitude, the alignment may be detected. Alternatively, in a case where the camera 34 of the unmanned aerial vehicle 30 can capture an image of the upper side, the camera 34 may read a marker attached to the curved surface of the main body portion 21 to detect the alignment.

When the position alignment is detected, the control unit 31 of the unmanned aerial vehicle 30 detects that the gripped portion 304 is gripped by the gripping portion 23 of the storage device 20. Specifically, the control unit 31 controls the flying propeller 35 to slightly move the unmanned aerial vehicle 30 back and forth and left and right. In a case where the control unit 31 recognizes that the end portion of the gripping portion 23 has penetrated the inside of the semi-annular gripped portion 304 and the gripped portion 304 has been caught by the gripping portion 23, the control unit may detect the gripping. Gripping may be detected by any method, and for example, gripping may be detected via any sensor included in the gripped portion 304. Alternatively, gripping may be detected by analyzing an image captured by the camera 34 capable of capturing images of the gripping portion 23 and the gripped portion 304 by an arbitrary image analysis method.

When gripping by the gripping portion 23 is detected, the control unit 31 controls the flying propeller 35 to stop the operation. In this way, the unmanned aerial vehicle 30 terminates the flight and is stored in the storage device 20.

When the unmanned aerial vehicle 30 starts from the storage device 20, first, the control unit 31 controls and operates the flying propeller 35 to generate lift. The control unit 31 slightly moves the unmanned aerial vehicle 30 back and forth and left and right, and detects that the end portion of the gripping portion 23 has come out of the inside of the semi-annular gripped portion 304. In this way, the gripping by the gripping portion 23 is released, and the unmanned aerial vehicle 30 can move downward from the storage device 20 and fly in the manhole 100 again.

As described above, the storage device 20 according to the present embodiment is a storage device that stores the unmanned aerial vehicle 30, and includes the main body portion 21 having a curved surface on which the unmanned aerial vehicle 30 is movable by bringing the wheels 302 into contact therewith, and the gripping portion 23 for gripping the unmanned aerial vehicle 30.

According to the present embodiment, even when the unmanned aerial vehicle 30 flies to an arbitrary appropriate position of the storage device 20, the unmanned aerial vehicle 30 can be stored at an appropriate position by the wheels 302 moving on the main body portion 21 of the storage device 20. In addition, since the main body portion 21 of the storage device 20 has the curved surface, it is possible to prevent the unmanned aerial vehicle 30 from colliding or reversing when returning to the storage device 20, losing balance, and falling. Therefore, it is possible to provide the storage device 20 capable of safely performing the departure and return operations of the unmanned aerial vehicle 30 without human intervention.

As described above, the unmanned aerial vehicle 30 according to the present embodiment includes the main body portion 303a and the main body portion 303b, the flying propeller 35, the support portion 301 extending upward from the main body portion 303a, and the wheels 302 provided at the end portions of the support portion 301 and at least partially protruding upward from the upper surface of the flying propeller 35.

According to the present embodiment, when the unmanned aerial vehicle 30 returns to the vicinity of the storage device 20, the unmanned aerial vehicle can move on the main body portion 21 of the storage device 20 and be stored at an appropriate position only by continuing to ascend. It is not necessary to return the unmanned aerial vehicle 30 to the storage device 20 by delicate control, and the convenience of the operation of the unmanned aerial vehicle 30 is improved. Therefore, it is possible to provide the unmanned aerial vehicle 30 capable of safely performing the departure and return operations of the unmanned aerial vehicle 30 without human intervention.

(Modification 1)

Figure 6A:
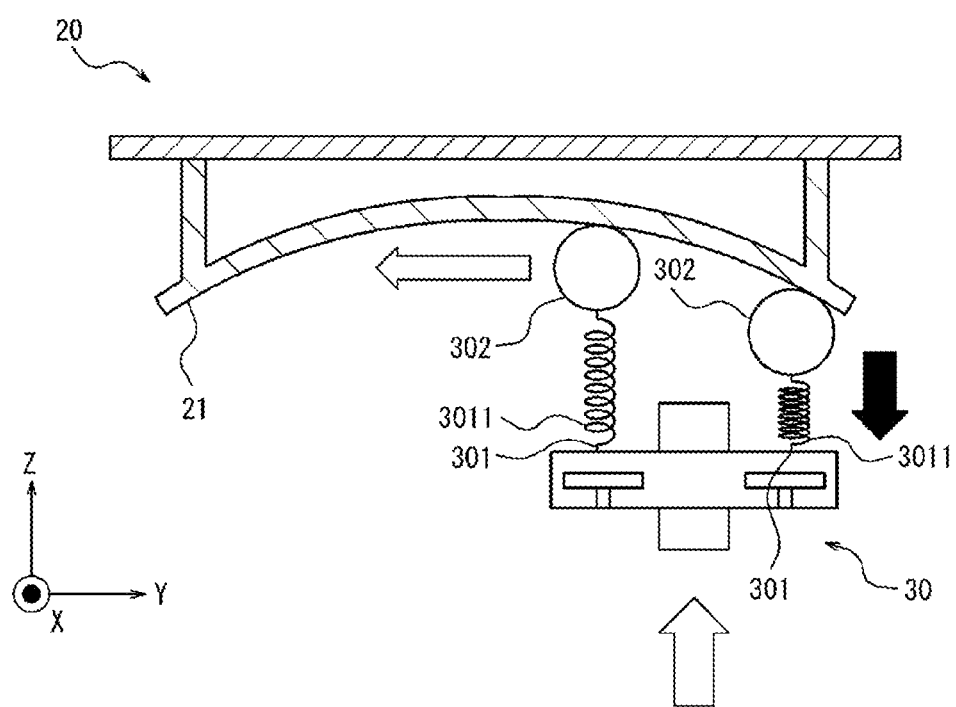
FIG. 6A is a view for describing a system according to Modification 1.

As a modification of the present disclosure, as illustrated in FIG. 6A, a part or the whole of the support portion 301 of the unmanned aerial vehicle 30 may be formed of an elastic body 3011. The elastic body 3011 can be formed of, for example, a spring, rubber, or a member made of a combination of a spring and rubber. Since the support portion 301 is formed of the elastic body 3011, the wheel 302 can expand and contract in the vertical direction.

Figure 6B:
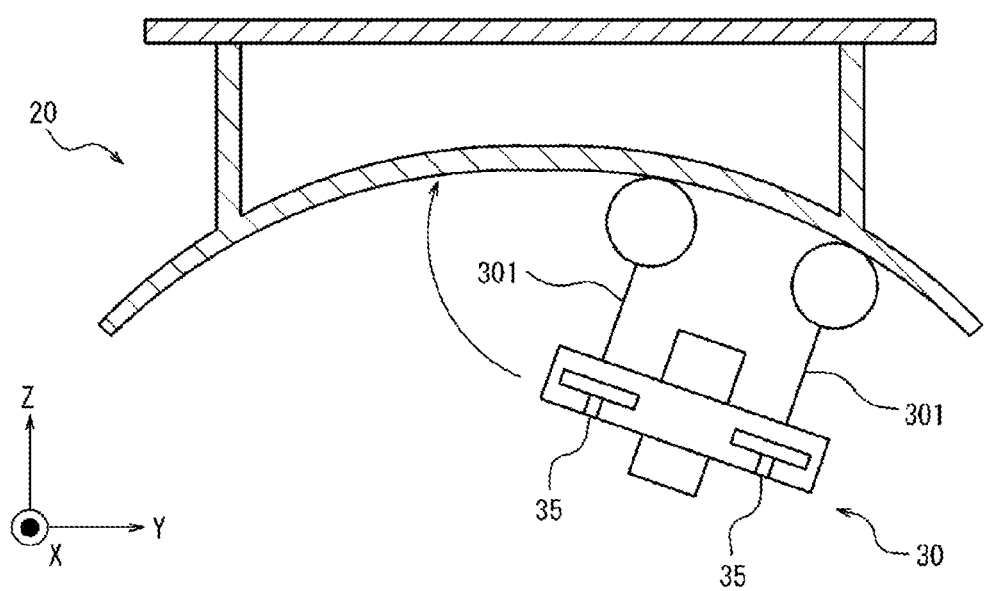
FIG. 6B is a view for describing the system according to Modification 1.

FIG. 6B illustrates an example in which the support portion 301 is not formed of the elastic body 3011. In this case, when the flying propeller 35 sucks air from the upper surface, the unmanned aerial vehicle 30 is forcibly sucked by the main body portion 21. Then, when the wheels 302 come into contact with the main body portion 21, the entire unmanned aerial vehicle 30 tilts. In this way, there is concern that the unmanned aerial vehicle 30 loses its balance and reverses, loses buoyancy, and falls. In the unmanned aerial vehicle 30 according to the present modification, as illustrated in FIG. 6A, a plurality of support portions 301 included in the unmanned aerial vehicle 30 are formed of elastic bodies 3011. Among them, the support portion 301 in contact with the peripheral edge portion side of the main body portion 21 of the storage device 20 is contracted in the direction of the black arrow by the elastic body 3011. Accordingly, the unmanned aerial vehicle 30 can move on the curved surface of the main body portion 21 in a state of maintaining a horizontal attitude and perform alignment.

As described above, in the unmanned aerial vehicle 30 according to the present modification, the support portion 301 includes the elastic body 3011.

According to the present modification, even when the unmanned aerial vehicle 30 flies to the peripheral edge portion side of the main body portion 21 of the storage device 20 having a relatively high curvature, the unmanned aerial vehicle 30 can move in contact with the main body portion 21 while maintaining a horizontal attitude. Therefore, it is possible to prevent the unmanned aerial vehicle 30 from being forcibly sucked by the main body portion 21 of the storage device 20 due to the suction of the air from the upper surface of the flying propeller 35, and the unmanned aerial vehicle 30 from reversing and falling. As described above, according to the present modification, it is possible to provide the unmanned aerial vehicle 30 capable of safely performing the departure and return operations of the unmanned aerial vehicle 30 without human intervention.

(Modification 2)

Figure 7A:
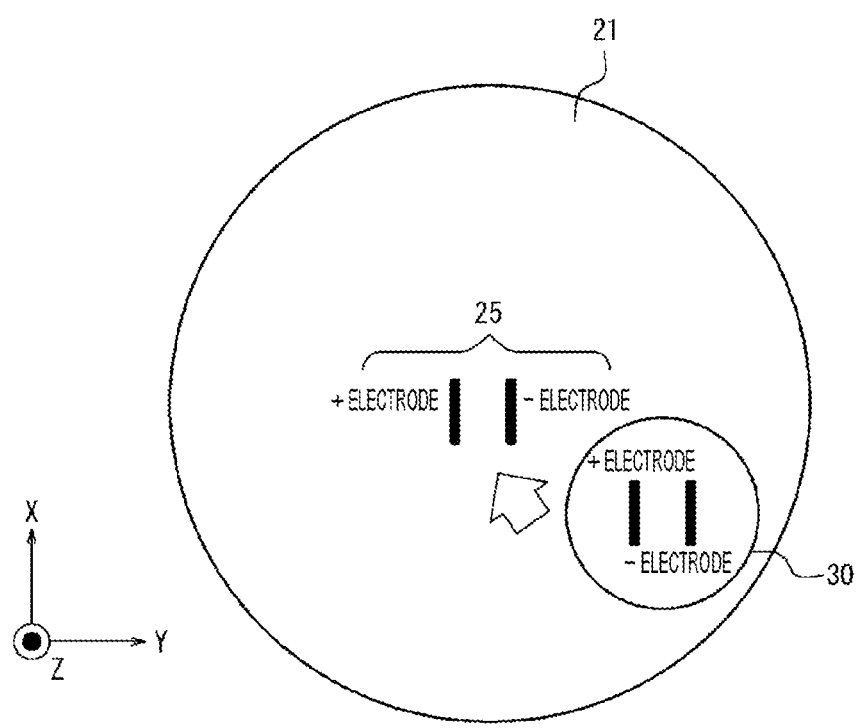
FIG. 7A is a view for describing a system according to Modification 2.
Figure 7B:
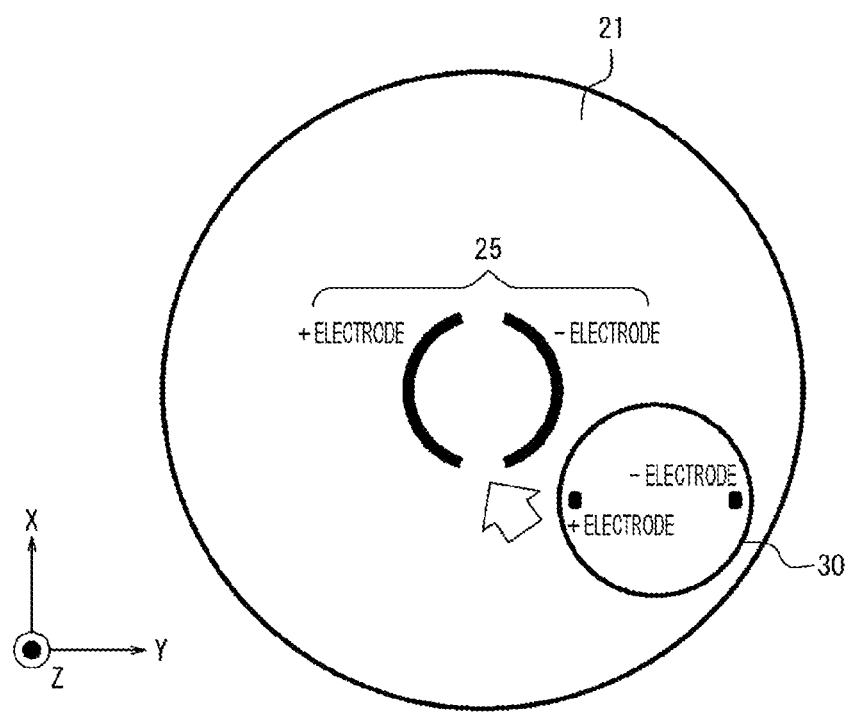
FIG. 7B is a view for describing the system according to Modification 2.

As a modification of the present disclosure, as illustrated in FIGS. 7A and 7B, the storage device 20 may include an electrode as a power supply unit 25 so that the battery of the unmanned aerial vehicle 30 can be charged. In the present modification, the storage device 20 also has a function as a power supply device.

Specifically, in the present modification, the storage device 20 includes an anode and a cathode as the power supply unit 25, and the unmanned aerial vehicle 30 also includes an anode and a cathode. The storage device 20 includes the power supply unit 25 on the curved surface of the main body portion 21, and the unmanned aerial vehicle 30 includes an electrode on the upper surface of the control box 311 or the upper surface of the main body portion 303a. When the unmanned aerial vehicle 30 is aligned with the storage device 20, the anode of the unmanned aerial vehicle 30 is connected to the cathode of the storage device 20, and the cathode of the unmanned aerial vehicle 30 is connected to the anode of the storage device 20. At this time, the storage device 20 charges the unmanned aerial vehicle 30.

FIGS. 7A and 7B illustrate examples of arrangement of electrodes of the storage device 20 and the unmanned aerial vehicle 30. FIGS. 7A and 7B are views of the unmanned aerial vehicle 30 seen from above through the storage device 20. The unmanned aerial vehicle 30 moves in the direction of the white arrow, and alignment is performed. As illustrated in FIG. 7A, each electrode may have a linear shape. In this case, when the unmanned aerial vehicle 30 is aligned in the vicinity of the center point of the storage device 20, the unmanned aerial vehicle 30 can rotate in the horizontal direction to adjust the angle so that the positions of the electrodes are aligned. In addition, as illustrated in FIG. 7B, the electrodes as the power supply unit 25 included in the storage device 20 may be arranged in a curved belt-like shape with a constant distance from the center point, and the electrodes included in the unmanned aerial vehicle 30 may be arranged in a dotted shape. Thus, when the unmanned aerial vehicle 30 is aligned with the storage device 20, the electrodes can be connected without rotating in the horizontal direction to adjust the angle.

Instead of the unmanned aerial vehicle 30, the gripping portion 23 of the storage device 20 may be rotated in the horizontal direction to bring the electrodes into contact with each other when the unmanned aerial vehicle 30 is gripped. In addition, the present disclosure is not limited to the example of the arrangement of the electrodes illustrated in FIGS. 7A and 7B, and for example, in FIG. 7B, the electrodes included in the unmanned aerial vehicle 30 may be arranged in a curved belt-like shape, and the electrodes included in the storage device 20 may be arranged in a dotted shape.

As described above, in the storage device 20 according to the present modification, the main body portion 21 includes the power supply unit 25 that supplies power to the unmanned aerial vehicle 30.

According to the present modification, the unmanned aerial vehicle 30 can be charged while the unmanned aerial vehicle 30 is stored in the storage device 20. Therefore, the unmanned aerial vehicle 30 can continuously fly, and the convenience is improved. In addition, it is possible to prevent the likelihood that the unmanned aerial vehicle 30 falls due to the battery exhaustion. Therefore, it is possible to provide the storage device 20 capable of safely performing the departure and return operations of the unmanned aerial vehicle 30 without human intervention.

(Modification 3)

As a modification of the present disclosure, the gripping portion 23 of the storage device 20 may be a recess having a substantially circular cross section.

Figure 8A:
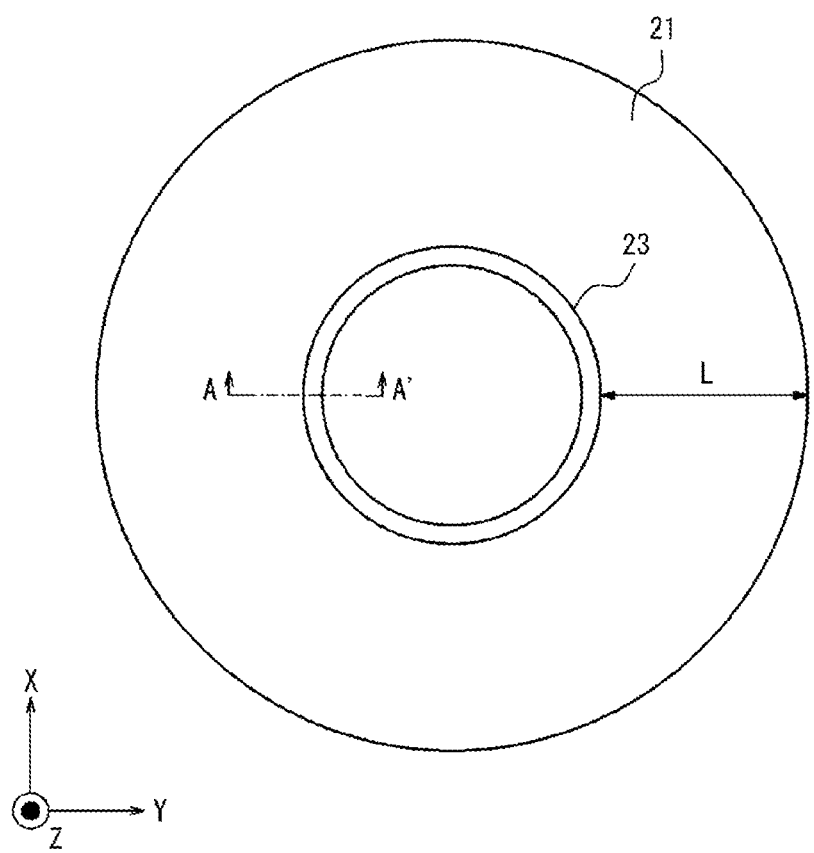
FIG. 8A is a view for describing a system according to Modification 3.

Specifically, as illustrated in FIG. 8A, the recess as the gripping portion 23 is configured as a groove arranged in a circular shape at an equal distance from the center point of the main body portion 21 of the storage device 20. The circular groove shape facilitates gripping of the unmanned aerial vehicle 30 even when the unmanned aerial vehicle 30 flies from any direction of the storage device 20. The configuration of the recess is not limited thereto.

Figure 8B:
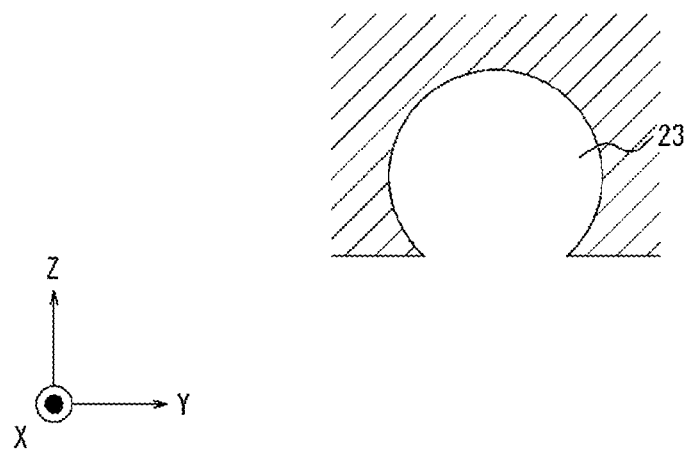
FIG. 8B is a view for describing the system according to Modification 3.

FIG. 8B is a cross-sectional view of the recess taken along line A-A' in FIG. 8A. The cross section of the recess as the gripping portion 23 is not limited to a substantially circular shape as illustrated in FIG. 8B, and may be a substantially elliptical shape, a substantially rectangular shape, or the like. The diameter of the cross section of the recess is equal to that of the wheel 302.

Figure 9A:
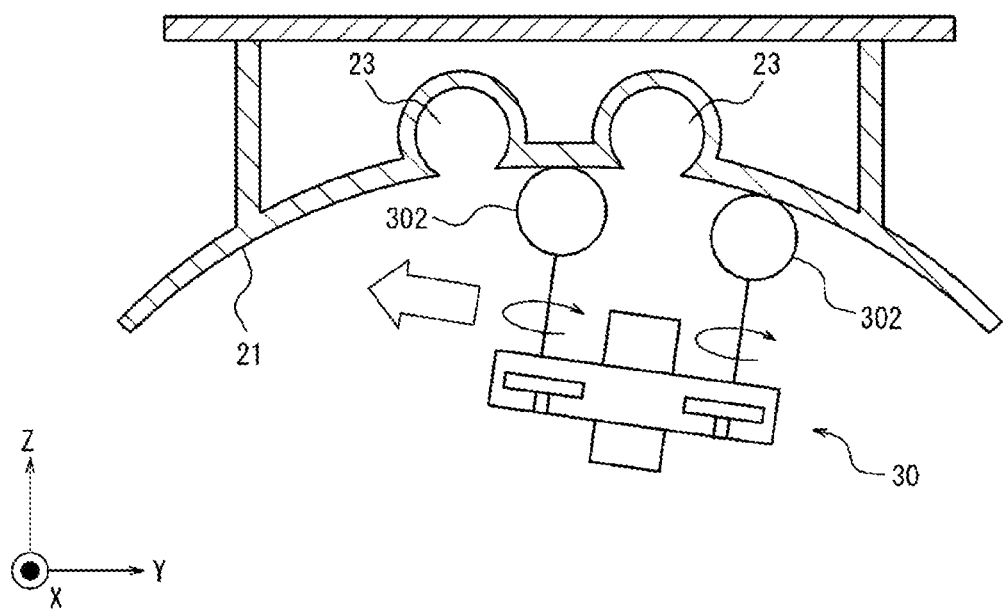
FIG. 9A is a view for describing the system according to Modification 3.
Figure 9B:
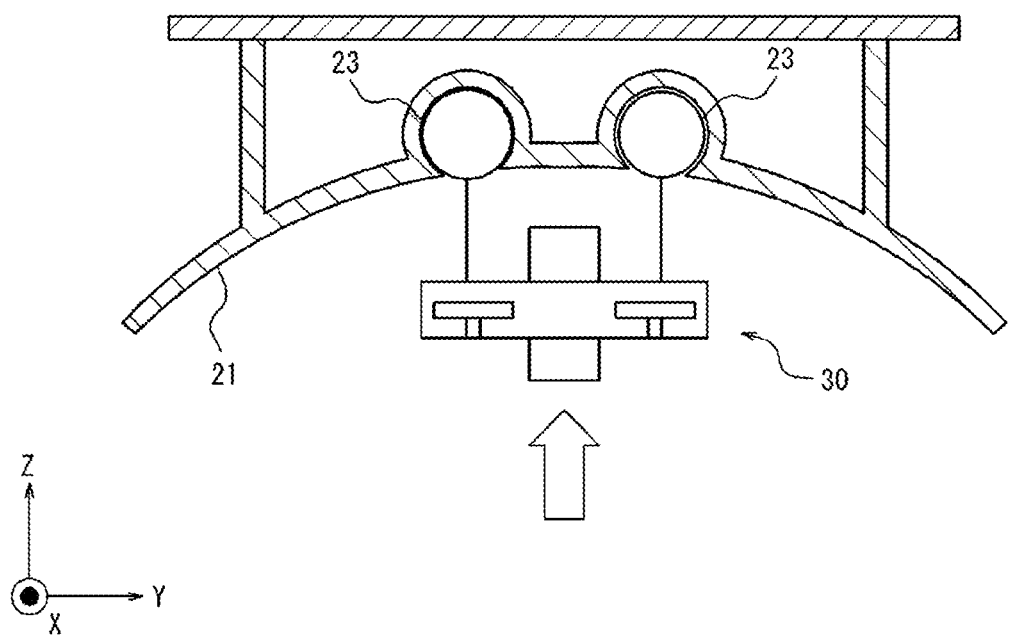
FIG. 9B is a view for describing the system according to Modification 3.

As illustrated in FIG. 9A, the unmanned aerial vehicle 30 moves with the wheels 302 in contact. Then, as illustrated in FIG. 9B, the unmanned aerial vehicle 30 ascends when aligned in the vicinity of the center point of the main body portion 21 of the storage device 20. The wheel 302 is pressed against the recess as the gripping portion 23 from below and is fitted into the recess as illustrated in FIG. 9B. In this way, the wheel 302 is stored in the recess, and as a result, the entire unmanned aerial vehicle 30 is gripped. In the present modification, the wheel 302 may be an elastic member such as rubber. Accordingly, when the wheel 302 is pressed against the recess, the shape of the wheel 302 is flattened and fitted into the recess.

Figure 8C:
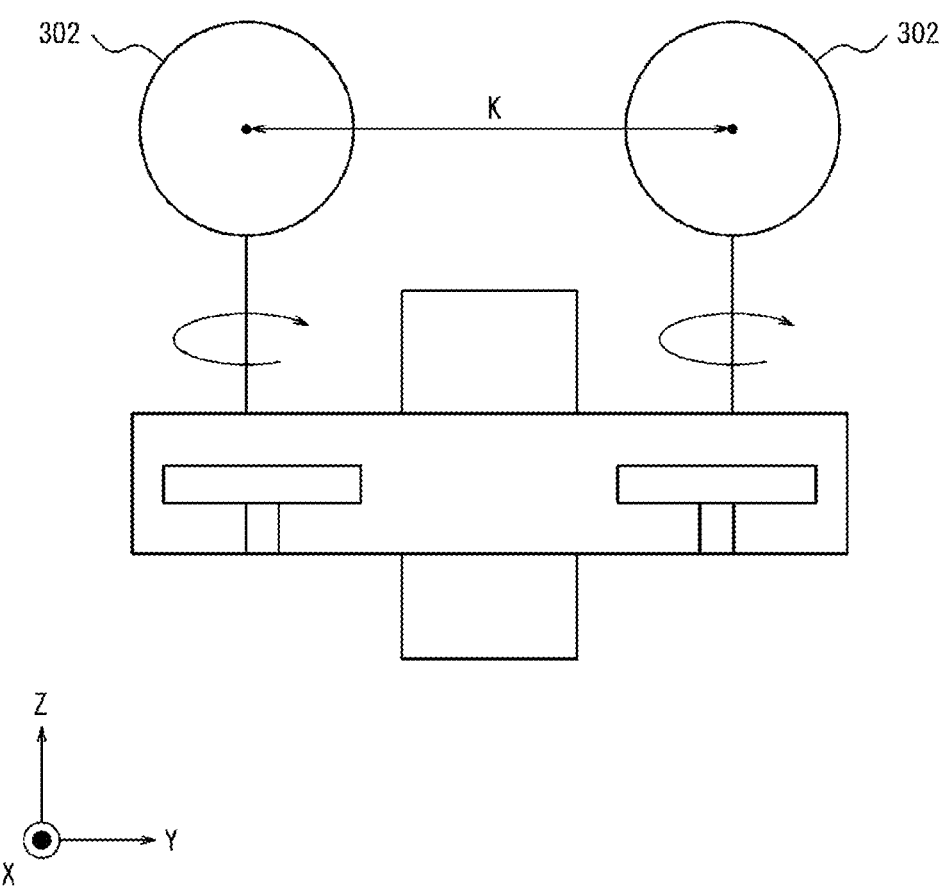
FIG. 8C is a view for describing the system according to Modification 3.
Figure 9C:
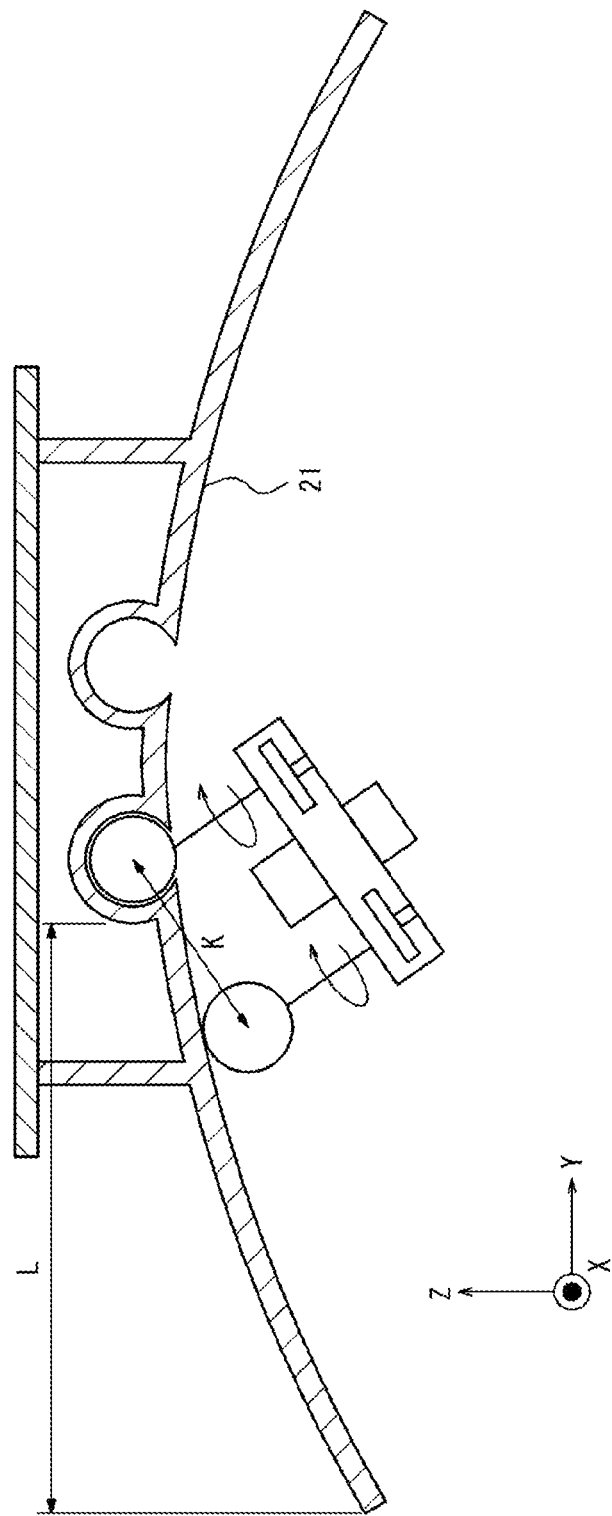
FIG. 9C is a view for describing the system according to Modification 3.

A distance L from the peripheral edge portion of the main body portion 21 of the storage device 20 to the recess as the gripping portion 23 illustrated in FIG. 8A may be designed to be shorter than a distance K between the central axes of the adjacent wheels 302 illustrated in FIG. 8C. Accordingly, as illustrated in FIG. 9C, it is possible to prevent the wheel 302 from being fitted into a wrong recess before alignment. In FIG. 9C, the distance L is designed to be longer than the distance K. While the unmanned aerial vehicle 30 is moving on the main body portion 21, the wheel 302 on the right side is not fitted into the recess on the right side and is fitted into the recess on the left side. As described above, when the distance L is designed to be longer than the distance K, there is an increased likelihood that the flying propeller 35 sucks air from the upper surface while the unmanned aerial vehicle 30 is moving on the main body portion 21, the unmanned aerial vehicle 30 is forcibly sucked by the main body portion 21, and the wheel 302 is fitted into a wrong position. This can be prevented by designing the distance L to be shorter than the distance K.

In the present modification, electrodes may be further provided inside the recess as the gripping portion 23, and electrodes may also be provided on the wheel 302 of the unmanned aerial vehicle 30. Accordingly, when the wheel 302 is fitted into the recess, the respective electrodes are connected, and the unmanned aerial vehicle 30 can be charged as in Modification 2.

As described above, in the storage device 20 according to the present modification, the gripping portion 23 grips the wheels 302 of the unmanned aerial vehicle 30.

According to the present modification, the unmanned aerial vehicle 30 can be reliably gripped by the storage device 20, and the unmanned aerial vehicle 30 can be prevented from falling. Therefore, it is possible to provide the storage device 20 capable of safely performing the departure and return operations of the unmanned aerial vehicle 30 without human intervention.

As described above, in the storage device 20 according to the present modification, the gripping portion 23 is a recess provided on the curved surface and capable of storing the wheel 302.

According to the present modification, when the unmanned aerial vehicle 30 flies toward the storage device 20, the unmanned aerial vehicle can be gripped by the storage device 20 only by continuing to ascend. It is not necessary to perform delicate control for gripping the unmanned aerial vehicle 30 by the gripping portion 23, and the unmanned aerial vehicle 30 can be easily and quickly and reliably gripped. Therefore, it is possible to provide the storage device 20 capable of safely performing the departure and return operations of the unmanned aerial vehicle 30 without human intervention.

(Modification 4)

Figure 10A:
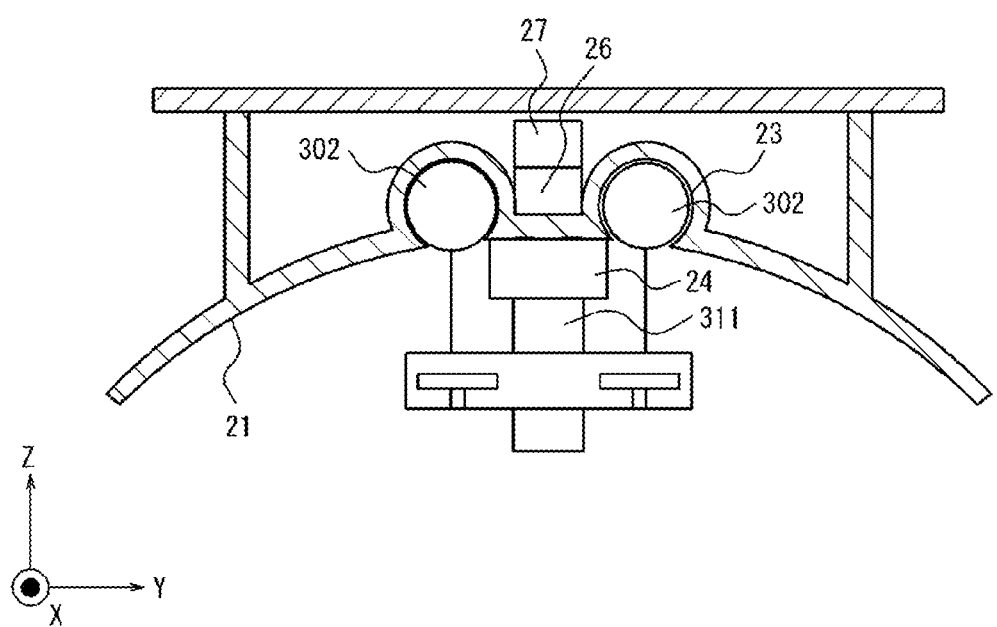
FIG. 10A is a view for describing a system according to Modification 4.
Figure 10B:
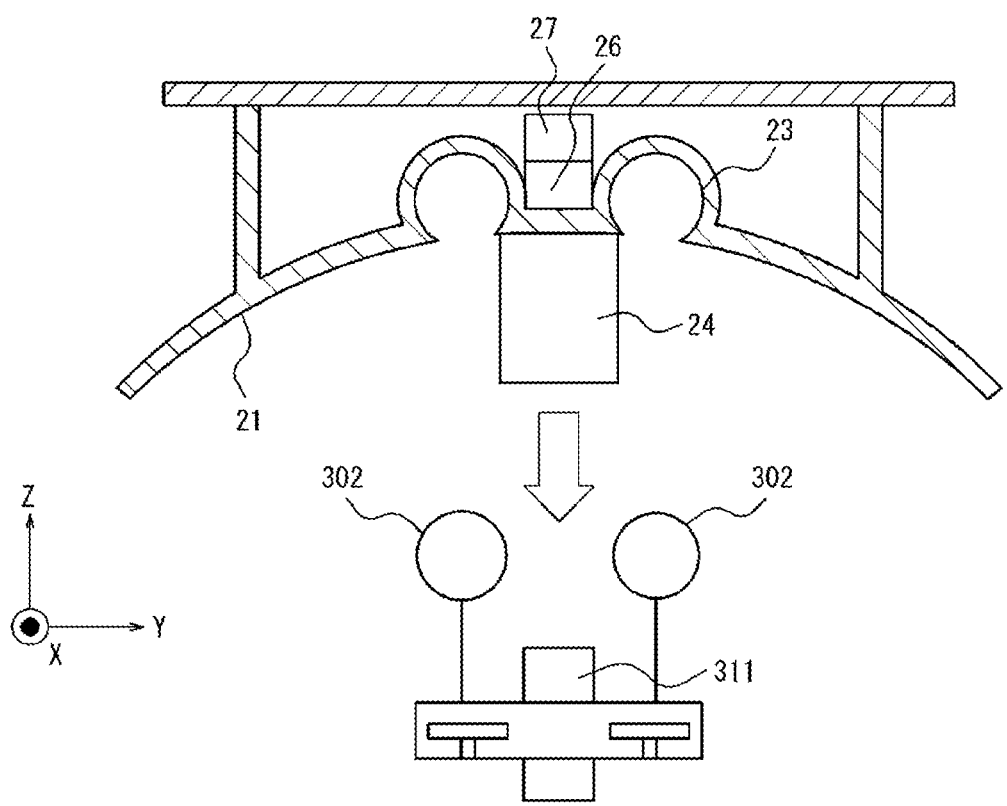
FIG. 10B is a view for describing the system according to Modification 4.

As a modification of the present disclosure, as illustrated in FIGS. 10A and 10B, the storage device 20 may include a push-out mechanism 24. The push-out mechanism 24 is driven by a motor. In the present modification, the storage device 20 includes a control unit 26 and a communication unit 27, and the operation of the push-out mechanism 24 is controlled by the control unit 26. The storage device 20 can communicate with the control unit 31 of the unmanned aerial vehicle 30 via the communication unit 27.

As illustrated in FIG. 10A, the push-out mechanism 24 is provided at the center position of the curved surface of the main body portion 21. Any configuration may be employed for the push-out mechanism 24. For example, the push-out mechanism 24 includes a cylinder portion provided in the main body portion 21 and a piston portion disposed inside the cylinder portion and moving in the vertical direction. When the control box 311 or the main body portion 303a of the unmanned aerial vehicle 30 is pushed downward by the piston portion, the gripping of the wheel 302 by the gripping portion 23 is released, and the entire unmanned aerial vehicle 30 is pushed out of the storage device 20. In this way, the unmanned aerial vehicle 30 can start.

With reference to FIGS. 10A, 10B, 11A, and 11B, operations at the time of departure and return from the storage device 20 of the unmanned aerial vehicle 30 in the present modification will be described. First, an operation at the time of departure will be described with reference to FIG. 11A.

In step S1 of FIG. 11A, the control unit 31 of the unmanned aerial vehicle 30 drives the flying propeller 35. In step S1, as illustrated in FIG. 10A, the wheels 302 of the unmanned aerial vehicle 30 are in a state of being gripped by the gripping portion 23.

In step S2, the control unit 31 determines whether the output value of the flying propeller 35 has reached a predetermined output value. The predetermined output value is an output value with which the unmanned aerial vehicle 30 can stand still at the same position in the air by the lift of the flying propeller 35. The control unit 31 repeats the operation of step S2 until it is determined that the predetermined output value has been reached. When it is determined that the predetermined output value has been reached, the operation of the control unit 31 proceeds to step S3.

In step S3, the control unit 31 transmits an instruction to the storage device 20 so that the push-out mechanism 24 pushes out the unmanned aerial vehicle 30. Specifically, the control unit 31 transmits an instruction to the storage device 20 via the communication unit 33.

In step S4, the storage device 20 receives the instruction from the unmanned aerial vehicle 30 via the communication unit 27.

In step S5, the control unit 26 of the storage device 20 pushes out the unmanned aerial vehicle 30 downward by the push-out mechanism 24. Specifically, the control unit 26 performs control to drive the motor of the push-out mechanism 24, and moves the piston portion of the push-out mechanism 24 downward as illustrated in FIG. 10B. When the control box 311 of the unmanned aerial vehicle 30 or the main body portion 303a in contact with the cylinder portion and the piston portion is pushed downward by the piston portion, the gripping of the wheel 302 by the gripping portion 23 is released. The entire unmanned aerial vehicle 30 is pushed out of the storage device 20 from the state illustrated in FIG. 10A to the state illustrated in FIG. 10B. In this way, the push-out mechanism 24 starts the unmanned aerial vehicle 30.

In step S6, the unmanned aerial vehicle 30 starts flight and departs. In this way, the unmanned aerial vehicle 30 can start the inspection of the inside of the manhole 100.

Next, the operation of the unmanned aerial vehicle 30 at the time of returning will be described with reference to FIG. 11B.

In step S7 of FIG. 11B, the unmanned aerial vehicle 30 flies to the vicinity of the storage device 20. The control unit 31 controls each unit of the unmanned aerial vehicle 30 and uses the GPS function, so that the unmanned aerial vehicle 30 can automatically fly to the vicinity of the storage device 20.

In step S8, the unmanned aerial vehicle 30 ascends from below the storage device 20 toward the main body portion 21 of the storage device 20. The unmanned aerial vehicle 30 moves to the vicinity of the center point of the main body portion 21 by bringing the wheels 302 into contact with the unmanned aerial vehicle, and alignment is performed.

In step S9, the control unit 26 of the storage device 20 determines whether the gripping portion 23 has gripped the unmanned aerial vehicle 30. Any method may be used for the detection of the gripping, but for example, the detection may be performed by the control unit 26 of the storage device 20 detecting that the electrode provided in the gripping portion 23 and the electrode provided in the unmanned aerial vehicle 30 are in contact with each other. The control unit 26 of the storage device 20 repeats the operation of step S9 until it is determined that the gripping portion 23 has gripped the unmanned aerial vehicle 30. When it is determined that the gripping portion 23 has gripped the unmanned aerial vehicle 30, the operation of the control unit 26 proceeds to step S10.

In step S10, the control unit 26 of the storage device 20 transmits an instruction to stop driving of the flying propeller 35 to the unmanned aerial vehicle 30. Specifically, the control unit 26 of the storage device 20 transmits an instruction to the unmanned aerial vehicle 30 via the communication unit 27 of the storage device 20.

In step S11, the unmanned aerial vehicle 30 receives the instruction from the storage device 20 via the communication unit 33.

In step S12, the control unit 31 of the unmanned aerial vehicle 30 stops driving of the flying propeller 35. In this way, as illustrated in FIG. 10A, the unmanned aerial vehicle 30 returns to a state of being gripped by and stored in the storage device 20.

As described above, in the unmanned aerial vehicle 30 according to the present modification, the main body portion 21 includes the push-out mechanism 24 that pushes out and starts the unmanned aerial vehicle 30.

According to the present modification, when the unmanned aerial vehicle 30 starts to travel from the storage device 20, the unmanned aerial vehicle can be more quickly and reliably removed from the gripping by the gripping portion 23. Since the unmanned aerial vehicle 30 can quickly start, the convenience of the unmanned aerial vehicle 30 is improved. Therefore, it is possible to provide the storage device 20 capable of safely performing the departure and return operations of the unmanned aerial vehicle 30 without human intervention.

As described above, the system 1 according to the present embodiment or the modifications includes the storage device 20 according to the present embodiment or the modifications, and the unmanned aerial vehicle 30 described in the present embodiment or the modifications.

According to the present embodiment or the modifications, the system 1 can appropriately store the unmanned aerial vehicle 30 in the storage device 20 without requiring delicate control. Therefore, it is possible to provide the unmanned aerial vehicle 30 capable of safely performing the departure and return operations of the unmanned aerial vehicle 30 without human intervention.

<Program>

In the above embodiment and modifications, the program for executing all or some of the functions or processes of the storage device 20 or the unmanned aerial vehicle 30 may be recorded in a computer-readable recording medium. Using such a recording medium makes it possible to install the program in the computer. Here, the recording medium on which the program is recorded may be a non-transitory recording medium. The non-transitory recording medium is not particularly limited, but may be, for example, a CD-ROM, a DVD-ROM, a Universal Serial Bus (USB) memory, or the like. The program may be downloaded from an external device via a network. The present disclosure can also be implemented as a program executable by a processor.

Although the present disclosure has been described based on the drawings and embodiments, it should be noted that those skilled in the art can easily make various modifications and amendments based on the present disclosure. Therefore, it should be noted that these modifications and amendments are included in the scope of the present disclosure.

As a further modification of the present disclosure, the main body portion 21 of the storage device 20 may have a structure in which an area thereof is horizontally expandable. According to the present modification, it is possible to attach the same storage device 20 to the lid 50 having various diameters.

REFERENCE SIGNS LIST

1 System
10 Terminal device
20 Storage device
21 Main body portion
22 Support portion
23 Gripping portion
24 Push-out mechanism
25 Power supply unit
26 Control unit
27 Communication unit
30 Unmanned aerial vehicle
31 Control unit
32 Memory
33 Communication unit
34 Camera
35 Flying propeller
36 GNSS receiver
37 Inertial measurement unit
38 Magnetic compass
39 Barometric altimeter
301 Support portion
302 Wheel
303a, 303b Main body portion
304 Gripped portion
311 Control box
3011 Elastic body
50 Lid
100 Manhole
101 Accumulated water

The invention claimed is:

1. A storage device for storing an unmanned aerial vehicle, the storage device comprising:
   a main body portion having a curved surface on which the unmanned aerial vehicle is movable by bringing a wheel of the unmanned aerial vehicle into contact therewith, wherein the curved surface comprises a center point that protrudes the most upward position of the curved surface; and
   a gripping portion for gripping the unmanned aerial vehicle below the curved surface for storage, wherein the gripping portion grips the wheel of the unmanned aerial vehicle.

2. The storage device according to claim 1, wherein the gripping portion represents a recess on the curved surface, and the recess includes a space for storing the wheel.

3. The storage device according to claim 1, wherein the main body portion includes a push-out mechanism that pushes out and starts the unmanned aerial vehicle.

4. The storage device according to claim 1, wherein the main body portion includes a power supply unit that supplies power to the unmanned aerial vehicle.

5. The storage device according to claim 1, wherein the main body portion includes a push-out mechanism that pushes out and starts the unmanned aerial vehicle.

6. A system comprising:
   a storage device comprising:
      a main body portion having a curved surface wherein the curved surface comprises a center point that protrudes the most upward position of the curved surface; and
      a gripping portion; and
   an unmanned aerial vehicle comprising:
      a main vehicle body portion;
      a flying propeller;
      a support portion, the support portion extending upward from the main vehicle body portion; and
      a wheel at an end portion of the support portion, the wheel at least partially protruding upward from an upper surface of the flying propeller, wherein
         the unmanned aerial vehicle is movable by bringing the wheel of the unmanned aerial vehicle into contact with the curved surface; and
         the gripping portion grips the unmanned aerial vehicle below the curved surface for storage.

7. The system according to claim 6, wherein the gripping portion grips the wheel of the unmanned aerial vehicle.

8. The system according to claim 7, wherein the gripping portion represents a recess on the curved surface, and the recess includes a space for storing the wheel.

9. The system according to claim 6, wherein the main body portion includes a power supply unit that supplies power to the unmanned aerial vehicle.

10. The system according to claim 6, wherein the main body portion includes a push-out mechanism that pushes out and starts the unmanned aerial vehicle.

11. The system according to claim 6, wherein the storage device is installed above an upper hole of a utility access hole.

12. The system according to claim 6, wherein the unmanned aerial vehicle receives power from a power supply in the main body portion of the storage device for storing the unmanned aerial vehicle.

* * * * *